July 22, 1930.  M. T. WESTHEIMER  1,770,962
HOLDER
Filed Sept. 16, 1926

Inventor
Mollie T. Westheimer

By Hardway Cather
Attorneys

Patented July 22, 1930

1,770,962

UNITED STATES PATENT OFFICE

MOLLIE T. WESTHEIMER, OF HOUSTON, TEXAS

HOLDER

Application filed September 16, 1926. Serial No. 135,835.

This invention relates to new and useful improvements in a holder.

One object of the invention is to provide a holder for cut flowers and the like adapted to be located in a bowl, or vase, and formed with channels for receiving the stems of the flowers, some of said channels extending vertically and others diverging upwardly so as to give a uniform contour, or spread to the bouquet of flowers held therein.

Another object of the invention is to provide a holder of the character described specially designed to give a uniform arrangement of the flowers of the bouquet and thereby improve the contour thereof.

With the above and other objects in view the invention has particular relation to certain novel features of construction, arrangement of parts and use, an example of which is given in this specification and illustrated in the accompanying drawings, wherein:—

Figure 1:
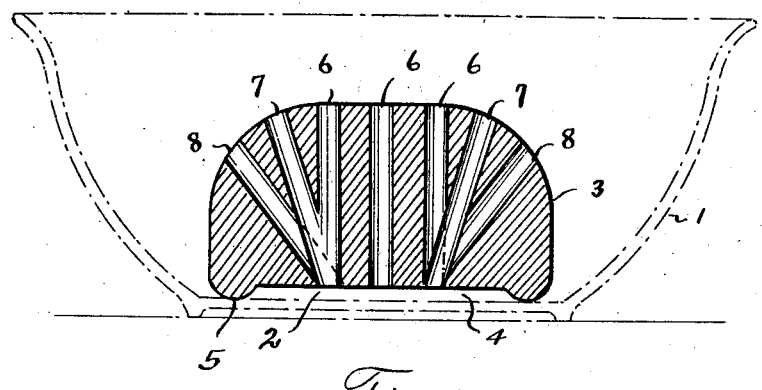
Figure 2:
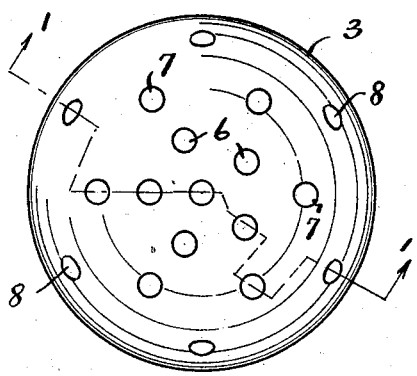

Figure 1 shows a vertical sectional view of the holder taken on the line 1—1 of Figure 2, and Figure 2 shows a plan view thereof.

Referring now more particularly to the drawings the numeral 1 designates a bowl or other container for the holder whose bottom 2 is slightly elevated. The numeral 3 designates a substantially hemispherical holder formed of a solid block and having a flat base 4 with the depending annular marginal rib 5 which surrounds the elevated portion 2 and holds the holder centered relative to the container 1. The top of the holder is preferably oval in form. The central part of the holder has a plurality of vertical channels 6 and around these there is a series of channels 7 which diverge upwardly and beyond the channels 7 there is another series of channels 8 having a greater upward angle of divergence than that of the channels 7. The stems of the flowers are inserted in these respective channels and the flowers will be thereby held in upwardly diverging relation to each other which will give a better contour, or spread to the bouquet held than holders now in common use for similar purposes.

The holder is preferably formed of glass but may be made of any other suitable material.

What I claim is:—

1. A holder for cut flowers and the like, said holder being formed of a single solid block of material, such as glass, and being substantially hemispherical in form, said block having a flat base and a depending marginal rib and having a convex upper face, said block having a plurality of series of channels therein to receive the stems of the flowers, an inner series of channels extending approximately vertically, an intermediate series of channels diverging upwardly with respect to the vertical channels and an outer series of channels diverging upwardly with respect to the vertical channels and having a greater angle of divergence from the vertical than the intermediate channels, each channel being of approximately uniform diameter from end to end.

2. A holder for cut flowers and the like formed of a solid block of material substantially hemispherical in form, having a flat base and having a plurality of series of channels to receive the flower stems, one series of channels extending vertically, another series of channels diverging from the vertical, and a third series of channels diverging from the vertical at a greater angle than the other diverging channels, each channel being of substantially uniform diameter from end to end and a marginal rib depending from and extending all the way around the base and having its under surface convex.

In testimony whereof I have signed my name to this specification.

MOLLIE T. WESTHEIMER.